(12) United States Patent
Komakine et al.

(10) Patent No.: US 12,438,202 B2
(45) Date of Patent: Oct. 7, 2025

(54) ELECTRIC STORAGE DEVICE, ELECTRIC VEHICLE, AND ELECTRIC POWER SYSTEM

(71) Applicant: MURATA MANUFACTURING CO., LTD., Kyoto (JP)

(72) Inventors: Fumihito Komakine, Kyoto (JP); Yosuke Yamada, Kyoto (JP); Shinichi Uesaka, Kyoto (JP); Atsushi Ozawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 497 days.

(21) Appl. No.: 17/951,400

(22) Filed: Sep. 23, 2022

(65) Prior Publication Data

US 2023/0019114 A1 Jan. 19, 2023

Related U.S. Application Data

(63) Continuation of application No. PCT/JP2021/011869, filed on Mar. 23, 2021.

(30) Foreign Application Priority Data

Mar. 26, 2020 (JP) ................................ 2020-055295

(51) Int. Cl.
*H01M 10/42* (2006.01)
*G01R 31/36* (2020.01)
(Continued)

(52) U.S. Cl.
CPC ...... *H01M 10/425* (2013.01); *G01R 31/3648* (2013.01); *G01R 31/385* (2019.01); *H01M 10/633* (2015.04); *H01M 2010/4271* (2013.01)

(58) Field of Classification Search
CPC ........... H01M 10/425; H01M 10/4271; H01M 10/4278; H01M 10/443; H01M 10/441;
(Continued)

(56) References Cited

U.S. PATENT DOCUMENTS

| | | | | |
|---|---|---|---|---|
| 2012/0043929 A1* | 2/2012 | Yazami | ............. | H02J 7/007184 320/160 |
| 2013/0249493 A1* | 9/2013 | Kim | ........................ | B60L 58/12 320/134 |

(Continued)

FOREIGN PATENT DOCUMENTS

| | | |
|---|---|---|
| JP | 2004222427 A | 8/2004 |
| JP | 2014173953 A | 9/2014 |

(Continued)

OTHER PUBLICATIONS

Japanese Office Action issued Jul. 4, 2023 in corresponding Japanese Application No. 2022-510518.

(Continued)

*Primary Examiner* — Raymond Alejandro
(74) *Attorney, Agent, or Firm* — K&L Gates LLP

(57) ABSTRACT

Provided is an electric storage device including: an electric storage unit; a temperature measurement unit that detects the temperature of the electric storage unit; a current measurement unit that measures the charge/discharge current of the electric storage unit; and a safety evaluation unit that calculates the safety evaluation value of the electric storage unit, where the safety evaluation unit determines a temperature range to which the temperature detected by the temperature measurement unit belongs among multiple temperature ranges, and calculates a safety evaluation value, based on the temperature range as a result of the determination and an accumulated value of a value related to the charge/discharge time of the electric storage unit.

15 Claims, 9 Drawing Sheets

(51) Int. Cl.
*G01R 31/385* (2019.01)
*H01M 10/633* (2014.01)

(58) Field of Classification Search
CPC .............. H01M 10/446; H01M 10/633; H01M 10/635; H01M 2010/4271; G01R 31/385; G01R 31/3648
See application file for complete search history.

(56) References Cited

U.S. PATENT DOCUMENTS

| | | |
|---|---|---|
| 2015/0362557 A1 | 12/2015 | Takashima et al. |
| 2017/0117587 A1 | 4/2017 | Sugeno et al. |
| 2017/0233820 A1 | 8/2017 | Kottwitz et al. |
| 2018/0267108 A1* | 9/2018 | Morita ................. H01M 10/486 |
| 2021/0288357 A1 | 9/2021 | Kuriki et al. |

FOREIGN PATENT DOCUMENTS

| | | | |
|---|---|---|---|
| JP | 2015204149 A | 11/2015 |
| JP | 2018500933 A | 1/2018 |
| JP | 2019023995 A | 2/2019 |
| JP | 2019220471 A | 12/2019 |

OTHER PUBLICATIONS

International Search Report of corresponding PCT application PCT/JP2021/011869, dated Jun. 8, 2021.

* cited by examiner

FIG. 2

D PARAMETER

| | | TEMPERATURE [°C] | | | | | |
|---|---|---|---|---|---|---|---|
| | CHARGE/DISCHARGE CURRENT RATE | -20≤Temp<0 | 0≤Temp<20 | 20≤Temp<40 | 40≤Temp<60 | 60≤Temp<80 |
| CURRENT [C] | 3<C≤4 | 2000 | 100 | 30 | 50 | 80 |
| | 2<C≤3 | 1500 | 80 | 15 | 30 | 60 |
| | 1<C≤2 | 1000 | 60 | 5 | 20 | 40 |
| | 0<C≤1 | 500 | 50 | 0 | 0 | 20 |
| | C=0 | 0 | 0 | 0 | 0 | 0 |
| | -1≤C<0 | 0 | 0 | 0 | 0 | 0 |
| | -2≤C<-1 | 5 | 5 | 5 | 5 | 5 |
| | -3≤C<-2 | 10 | 10 | 10 | 10 | 10 |
| | -4≤C<-3 | 20 | 20 | 20 | 20 | 20 |

FIG. 3

F PARAMETER

| VOLTAGE ZONE | F |
|---|---|
| $3.45 \leq V$ | 1.5 |
| $3.40 \leq V < 3.45$ | 1.0 |
| $3.35 \leq V < 3.40$ | 0.5 |
| $V < 3.35$ | 0.2 |

FIG. 4

ACCUMULATED VALUE OF CHARGE/DISCHARGE TIME

| | | TEMPERATURE [°C] | | | | | |
|---|---|---|---|---|---|---|---|
| | CHARGE/DISCHARGE CURRENT RATE [C] | $-20 \leq \text{Temp} < 0$ | $0 \leq \text{Temp} < 20$ | $20 \leq \text{Temp} < 40$ | $40 \leq \text{Temp} < 60$ | $60 \leq \text{Temp} < 80$ | |
| CURRENT [C] | $3 < C \leq 4$ | 0 | 0 | 0 | 0 | 0 | |
| | $2 < C \leq 3$ | 0 | 0 | 0 | 0 | 0 | |
| | $1 < C \leq 2$ | 0 | 0 | 100 | 0 | 0 | |
| | $0 < C \leq 1$ | 1 | 10 | 800 | 0 | 0 | |
| | $C = 0$ | 100 | 100 | 900 | 0 | 0 | |
| | $-1 \leq C < 0$ | 0 | 0 | 1000 | 0 | 0 | |
| | $-2 \leq C < -1$ | 0 | 0 | 10 | 0 | 0 | |
| | $-3 \leq C < -2$ | 0 | 0 | 0 | 0 | 0 | |
| | $-4 \leq C < -3$ | 0 | 0 | 0 | 0 | 0 | |

FIG. 5

CHARGE/DISCHARGE CYCLE VALUE

| | CHARGE/DISCHARGE CURRENT RATE [C] | TEMPERATURE [°C] | | | | | |
|---|---|---|---|---|---|---|---|
| | | −20≤Temp<0 | 0≤Temp<20 | 20≤Temp<40 | 40≤Temp<60 | 60≤Temp<80 |
| CURRENT [C] | 3<C≤4 | 0 | 0 | 0 | 0 | 0 |
| | 2<C≤3 | 0 | 0 | 0 | 0 | 0 |
| | 1<C≤2 | 0 | 0 | 0.2 | 0 | 0 |
| | 0<C≤1 | 0.001 | 0.01 | 0.8 | 0 | 0 |
| | C=0 | 0 | 0 | 0 | 0 | 0 |
| | −1≤C<0 | 0 | 0 | 1 | 0 | 0 |
| | −2≤C<−1 | 0 | 0 | 0.02 | 0 | 0 |
| | −3≤C<−2 | 0 | 0 | 0 | 0 | 0 |
| | −4≤C<−3 | 0 | 0 | 0 | 0 | 0 |

FIG. 6

LITHIUM-DEPOSITION DETERIORATION RATE [%]

| CHARGE/DISCHARGE CURRENT RATE [C] | TEMPERATURE [°C] | | | | | | | SUM |
|---|---|---|---|---|---|---|---|---|
| | -20≤Temp<0 | 0≤Temp<20 | 20≤Temp<40 | 40≤Temp<60 | 60≤Temp<80 | | | |
| 3<C≤4 | 0 | 0 | 0 | | 0 | | | 0 |
| 2<C≤3 | 0 | 0 | 0 | | 0 | | | 0 |
| 1<C≤2 | 0 | 0 | 1.5 | | 0 | | | 1.5 |
| 0<C≤1 | 0.75 | 0.75 | 0 | | 0 | | | 1.5 |
| C=0 | 0 | 0 | 0 | | 0 | | | 0 |
| -1≤C<0 | 0 | 0 | 0 | | 0 | | | 0 |
| -2≤C<-1 | 0 | 0 | 0.15 | | 0 | | | 0.15 |
| -3≤C<-2 | 0 | 0 | 0 | | 0 | | | 0 |
| -4≤C<-3 | 0 | 0 | 0 | | 0 | | | 0 |
| | | | | | | | | 3.15 |

CURRENT [C]

| LITHIUM-DEPOSITION DETERIORATION RATE [%] | SOS [%] | CONDITION |
|---|---|---|
| 0 | 100.0 | NORMAL OPERATION RANGE |
| 10 | 83.3 | NORMAL OPERATION RANGE |
| 20 | 66.7 | NORMAL OPERATION RANGE |
| 30 | 50.0 | NORMAL OPERATION RANGE |
| 40 | 33.3 | NORMAL OPERATION RANGE |
| 50 | 16.7 | NORMAL OPERATION RANGE |
| 60 | 0.0 | BREAKDOWN |
| 70 | 0.0 | BREAKDOWN |

ELECTRIC STORAGE DEVICE, ELECTRIC VEHICLE, AND ELECTRIC POWER SYSTEM

CROSS REFERENCE TO RELATED APPLICATIONS

The present application is a continuation of PCT patent application no. PCT/JP2021/011869, filed on Mar. 23, 2021, which claims priority to Japanese patent application no. JP2020-055295, filed on Mar. 26, 2020, the entire contents of which are herein incorporated by reference.

BACKGROUND

The present application relates to an electric storage device, an electric vehicle, and an electric power system.

In recent years, secondary batteries have been expanding in application. For example, lithium ion secondary batteries, which are typical examples of secondary batteries, have been expanding in application not only to various electronic devices but also to automobiles, motorcycles, electric flight vehicles, and the like. A configuration including one or a plurality of lithium ion secondary batteries and including a protective circuit or the like for the lithium ion secondary batteries is generally referred to as an electric storage module.

It is desirable for the electric storage module to ensure the safety thereof. For example, an electric storage system is described that has a safety diagnosis function. In addition, a device is described that measures the degree of deterioration of a lithium ion secondary battery cell.

SUMMARY

The present application relates to an electric storage device, an electric vehicle, and an electric power system.

In general, in a lithium ion secondary battery, a charge/discharge current flows to deposit lithium (Li), which affects the safety of an electric storage module to which the lithium ion secondary battery is applied. The techniques described in the patent documents described above fail to consider deterioration that focuses on lithium deposited when a charge/discharge current flows, and the techniques are insufficient as a measure for evaluating the safety of an electric storage module.

Accordingly, the present application relates to providing an electric storage device, an electric vehicle, and an electric power system that evaluate the safety of an electric storage module in consideration of deterioration in the case of causing a charge/discharge current to flow according to an embodiment.

The present application provides, in an embodiment, an electric storage device including: an electric storage unit; a temperature measurement unit that detects the temperature of the electric storage unit; a current measurement unit that measures the charge/discharge current of the electric storage unit; and a safety evaluation unit that calculates the safety evaluation value of the electric storage unit, where the safety evaluation unit determines a temperature range to which the temperature detected by the temperature measurement unit belongs among multiple temperature ranges, and calculates a safety evaluation value, based on the temperature range as a result of the determination and an accumulated value of a value related to the charge/discharge time of the electric storage unit.

According to an embodiment of the present application, it is possible to appropriately measure the safety of the electric storage device. It is to be noted that the contents of the present application are not to be construed as being limited by the effects described herein.

BRIEF DESCRIPTION OF THE FIGURES

FIG. 2 is a diagram for explaining a D parameter according to an embodiment.

FIG. 3 is a diagram for explaining an F parameter according to an embodiment.

FIG. 4 is a diagram showing an example of an accumulated value of charge/discharge time.

FIG. 5 is a diagram showing an example of a charge/discharge cycle value.

FIG. 6 is a diagram for explaining an example of a lithium-deposition deterioration rate.

DETAILED DESCRIPTION

Hereinafter, one or more embodiments of the present application will be described below in further detail including with reference to the drawings.

The contents of the present application are not to be considered limited thereto.

First, for facilitating understanding of the present application, the following will be described. Examples of the index (measure) for the condition of a secondary battery (for example, a lithium ion secondary battery) for use in an electric storage module include an "SOC (State Of Charge)" and an "SOH (State Of Health)". The SOC is an index corresponding to the remaining capacity, and the SOH is an index corresponding to the deterioration of the lithium ion secondary battery. These indices determine the degree of deterioration of the lithium ion secondary battery, but there have been no index so far for the safety of the lithium ion secondary battery and an electric storage module to which the lithium ion secondary battery is applied. More specifically, lithium deposited when a charge/discharge current flows affects the safety, and the conventional indices lack such a viewpoint. Accordingly, when the safety is not affected if the lithium ion secondary battery itself is deteriorated, the use of the lithium ion secondary battery may have no choice but to be stopped in some cases, because there is no index related to the safety. In addition, it is also assumed that an index related to the safety of the electric storage module may be required in some cases in accordance with the international standard. In consideration of such viewpoints, the present application defines an index related to the safety of an electric storage module to which a lithium ion secondary battery is applied, thereby avoiding the disadvantages described above according to an embodiment. It is to be noted that in the following description, an index related to the safety of an electric storage module is appropriately referred to as a safety evaluation value or an SOS (State Of Safety).

Figure 1:
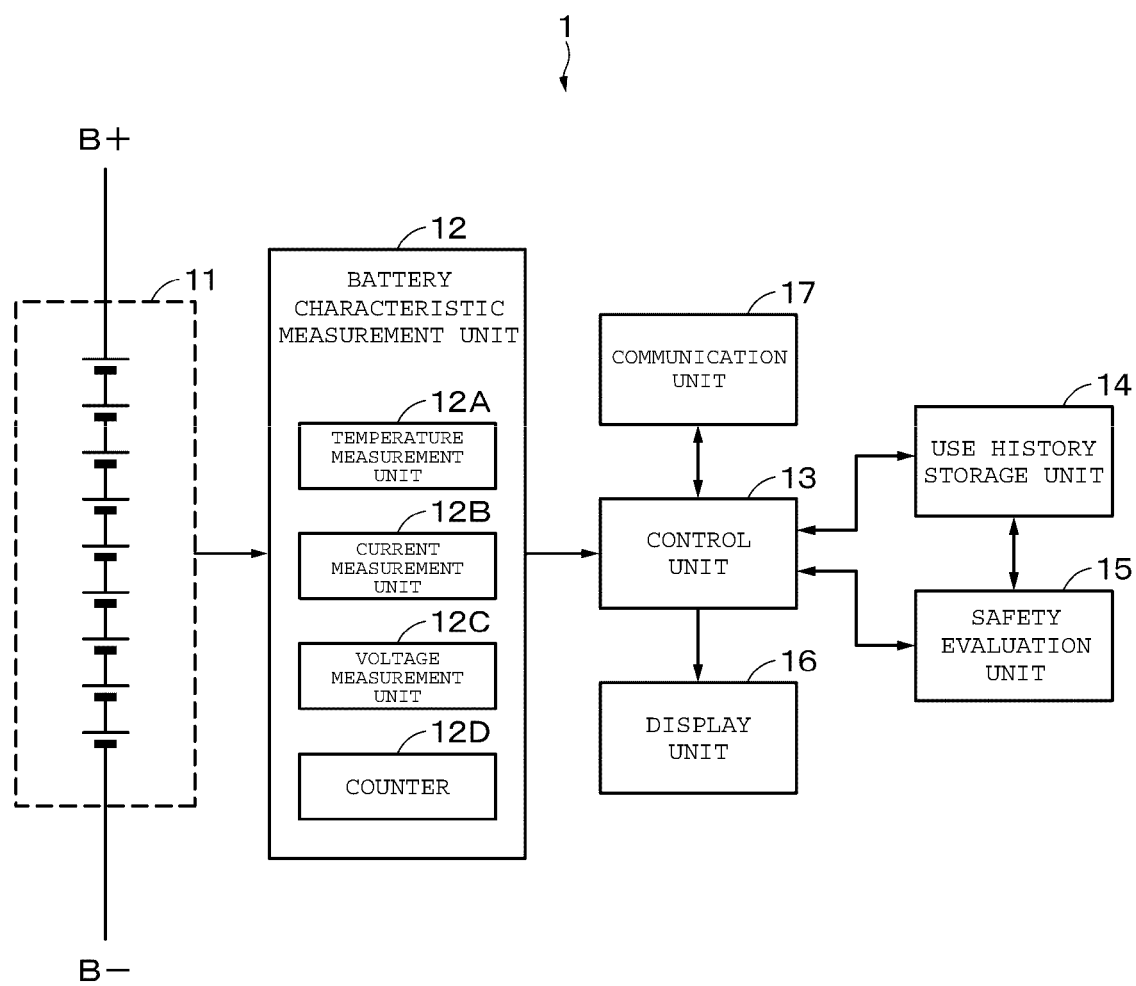
FIG. 1 is a block diagram illustrating a configuration example of an electric storage module according to an embodiment.

FIG. 1 is a block diagram illustrating a configuration example of an electric storage module (electric storage module 1) as electric storage device according to an embodiment. The electric storage module 1 includes an electric storage unit 11, a battery characteristic measurement unit 12, a control unit 13, a use history storage unit 14, a safety evaluation unit 15, a display unit 16, and a communication unit 17.

The electric storage unit 11 includes one or more lithium ion secondary batteries. According to an embodiment, the electric storage unit 11 has a configuration with nine lithium ion secondary batteries (unit cells) connected in series. The number and connection mode of the lithium ion secondary batteries included in the electric storage unit 11 can be appropriately changed.

The term of battery characteristic measurement unit 12 is a generic term for a plurality of sensors that measure characteristics of the electric storage unit 11. The battery characteristic measurement unit 12 includes, for example, a temperature measurement unit 12A, a current measurement unit 12B, a voltage measurement unit 12C, and a counter 12D. The temperature measurement unit 12A measures the temperature of the electric storage unit 11. The current measurement unit 12B measures a charge/discharge current of the electric storage unit 11. The voltage measurement unit 12C measures the voltage of the electric storage unit 11. It is to be noted that the measurement by each of the temperature measurement unit 12A, the current measurement unit 12B, and the voltage measurement unit 12C is performed periodically, for example, and the measurement results as use histories are stored in the use history storage unit 14 under the control of the control unit 13. The use histories stored in the use history storage unit 14 are updated, for example, each time the measurement is performed by the temperature measurement unit 12A or the like. The counter 12D measures a time (for example, seconds).

The control unit 13 includes a CPU (Central Processing Unit) and the like, and integrally controls the whole electric storage module 1. The control unit 13 includes a ROM (Read Only Memory) that holds a program, and a RAM (Random Access Memory) that is used as a work memory or the like when the program is executed (the illustration of the memories is omitted).

The use history storage unit 14 includes a nonvolatile memory, and stores measurement results provided by the battery characteristic measurement unit 12. The use history storage unit 14 is assumed to be a storage unit that is built in the electric storage module 1, but may be a storage unit that is detachable from the electric storage module 1.

The safety evaluation unit 15 calculates a safety evaluation value that is a value for evaluating the safety of the electric storage unit 11. Specifically, the safety evaluation unit 15 determines a temperature range to which the temperature detected by the temperature measurement unit 12A belongs among multiple temperature ranges, and calculates a safety evaluation value (SOS), based on the temperature range as a result of the determination and an accumulated value of a value related to the charge/discharge time of the electric storage unit 11. When the SOS becomes 0, it is determined that the electric storage module 1 is broken down, and the use of the electric storage module 1 is prohibited.

The display unit 16 includes an LCD (Liquid Crystal Display) and an OLED (Organic Light Emitting Diode).

According to an embodiment, the SOS calculated by the safety evaluation unit 15 is output from the safety evaluation unit 15, and the output SOS is supplied to the display unit 16 under the control of the control unit 13. Then, the SOS is displayed on the display unit 16.

The communication unit 17 communicates with an external device on a network such as the Internet, or communicates with another electric storage module or a BMS (Battery Management System) with the use of RS-485 or the like. The communication unit 17 includes a modulation/demodulation circuit corresponding to a communication system. The communication performed by the communication unit 17 may be a wire communication or a wireless communication. Examples of the wireless communication include a LAN (Local Area Network), Bluetooth (registered trademark), Wi-Fi (registered trademark), and a WUSB (Wireless USB).

The electric storage module 1 has a mechanism for recording times for which the module stays in a temperature zone, a current zone, and a voltage zone that are divided in a certain range. The recorded data is managed with, for example, a three-dimensional map of a temperature zone, a current zone, and a voltage zone, and the accumulated stay time for each zone is recorded. For example, when a charge current of 1 C flows at a cell surface temperature of 23° C. to keep a cell voltage of 3.38 V for 30 minutes, a time of 30 minutes is recorded to be accumulated in the past time in a region where a current zone of 0.3 C<I≤1 C, a temperature zone of 20° C.≤Temp<30° C., and a voltage zone of 3.35 V≤V<3.40 V are overlapped with each other on the map.

The SOS is calculated by the safety evaluation unit 15 of the electric storage module 1 with such a function. The safety evaluation unit 15 calculates the SOS, based on the following formula (1).

$$SOS = 100 - \frac{\sum(D*F*(\text{Cycle Number}))}{\text{Maximum Safety Deterioration Rate}} \times 100 \tag{1}$$

D in the formula (1) represents a D parameter, which is an example of a weighting coefficient. F in the formula (1) represents a voltage coefficient set depending on the voltage measured by the voltage measurement unit 12C. The "Cycle Number" in the formula (1) represents a charge/discharge cycle value (the number of cycles), which is a value calculated by multiplying the accumulated value of charge/discharge time (an example of the value related to the charge/discharge time) by the current value measured by the current measurement unit 12B and dividing the result by the rated capacity of the electric storage unit 11. It is to be noted that the time for which the SOC makes up the transitions from 0% to 100% and from 100% to 0% is defined as one cycle. The maximum safety deterioration rate is a value that is experimentally obtained by the method described later. It is to be note that the following formula (2) in the formula (1) described above represents:

$$\Sigma(D*F*(\text{Cycle Number})) \tag{2}$$

a lithium-deposition deterioration rate (%). The lithium-deposition deterioration rate is also used for the calculation of SOH. For example, the SOH is calculated by subtracting the sum of the storage deterioration rate and lithium-deposition deterioration rate from 100.

FIG. 2 is a diagram showing an example of the D parameter. As shown in FIG. 2, the D parameter is a weighting coefficient that is set for each of multiple temperature ranges laterally set for the electric storage unit 11. In addition, the D parameter is also a weighting coefficient that is set depending on the charge/discharge current (the current rate for each of charge and discharge) longitudinally set for the electric storage unit 11.

It is to be noted that "C" in the current rate for each of charge and discharge means Capacity, of which positive and negative values respectively indicate charge and discharge rates. C=0 indicates that no current is flowing, that is, the electric storage module 1 is not used. From the formula (1), as the D parameter is larger, the value of the SOS is smaller.

In the tables described below, the horizontal direction is referred to as a "row", the vertical direction is referred to as a "column", and the region defined by a predetermined parameter in the horizontal direction and a predetermined parameter in the vertical direction is referred to as a "cell", as appropriate.

The D parameter is set to have a larger value in the temperature range that is farther from a reference temperature range. For example, in a temperature range corresponding to the time of charging (with C including a positive value), when $20 \leq \text{Temp} \leq 40$ is set as a reference temperature range, the D parameter corresponding to a temperature range is set to have a larger value in the temperature range that is farther from the reference temperature range. For example, while the D parameter corresponding to a charge rate of "$2<C\leq3$" is "15" in the reference temperature range, the D parameter is set to be larger as the temperature range is farther from the reference temperature range, that is, "30", "60", "80", and "1500".

Furthermore, the D parameter is set to have a larger value as the temperature range is lower than the reference temperature range in the temperature range at the time of charging. For example, while the parameter corresponding to a charge rate of "$3<C\leq4$" is "30" in the reference temperature range, the D parameter is set to be larger as the temperature range is decreased from the reference temperature range, that is, "100" and "2000". The reason for setting as described above is because charging at a high charge rate under low temperature causes a large amount of lithium to be deposited, and then makes the capacity more likely to be degraded, thereby making the safety of the electric storage module 1 more likely to be deteriorated.

Furthermore, the D parameter is set to be larger as the charge rate and discharge rate at the charge/discharge current are increased. The reason for setting as described above is because more lithium is deposited as the charge rate and the discharge rate are increased, thereby making the safety of the electric storage module 1 more likely to be deteriorated.

It is to be noted that the temperature of the electric storage unit 11 in a case where the electric storage unit 11 has a plurality of lithium ion secondary batteries is appropriately specified by the average value, minimum value, maximum value, and the like of the temperature. The temperature range is determined with the use of the temperature of the electric storage unit 11 specified as described above.

FIG. 3 shows an example of an F parameter. The F parameter is a value that is set depending on the voltage of the electric storage unit 11, measured by the voltage measurement unit 12C. More specifically, the F parameter is a value that is set depending on a voltage range (stay voltage zone) to which the voltage of the electric storage unit 11, measured by the voltage measurement unit 12C, belongs. From the formula (1), as the F parameter is larger, the value of the SOS is smaller. The F parameter is set to have a larger value as the voltage value of the electric storage unit 11 is larger. The reason for setting as described above is because the increased voltage causes a large amount of lithium to be deposited, and then makes the capacity more likely to be degraded, thereby making the safety of the electric storage module 1 more likely to be deteriorated.

It is to be noted that the voltage of the electric storage unit 11 in a case where the electric storage unit 11 has a plurality of lithium ion secondary batteries may have the average value or minimum value of the voltage, or may have the maximum value thereof for ensuring the safety of the electric storage module 1, with a determination made for the severest SOS. In addition, the voltage of the electric storage unit 11 may be, rather than the current voltage, the average voltage of the electric storage unit 11 in the previous use history.

The safety evaluation unit 15 stores, in an appropriate memory, a two-dimensional map and tables that specify the F parameter and the D parameter described above.

A specific example of the charge/discharge cycle value will be described later. The accumulated value of the charge/discharge time required for calculating the charge/discharge cycle value is stored in the use history storage unit 14. FIG. 4 shows an example of the accumulated value of the charge/discharge time.

The temperature range to which the temperature of the electric storage unit 11, measured by the temperature measurement unit 12A, belongs, the predetermined charge rate or discharge rate measured at the time by the current measurement unit 12B, and the time of operating the electric storage module 1 at the charge rate or discharge rate measured by the counter 12D are supplied to the control unit 13. The control unit 13 writes the operating time measured by the counter 12D in the locations of the corresponding temperature range and charge rate (or discharge rate). If there is any operating time already written, the operating time measured is added to the operating time already written. The accumulated value of the charge/discharge time is stored in the use history storage unit 14. It is to be noted that the voltage of the battery is constant for simplicity in FIG. 4.

The maximum safety deterioration rate is experimentally determined depending on the characteristics of the battery. For example, the maximum safety deterioration rate is a value determined, after performing a low-temperature cycle test in advance, from the relationship between the capacity retention ratio after the low-temperature cycle and the safety degree of a safety test result, which is a maximum value in the range of the capacity retention ratio after the low-temperature cycle without having any safety problem if any cycle deterioration proceeds.

Specifically, the maximum safety deterioration rate is determined by the following method.

(1) Low-temperature cycle charge/discharge at −20° C. is performed to deteriorate the cell, and samples for each capacity retention ratio in Table 1 below are prepared. Each sample is subjected to a heating test, and the sample is determined to be OK when the sample is safe, or determined to be NG when the sample is unsafe. (Checking no ignition, burst or the like). It is to be noted that the heating test is performed in accordance with JIS C8714: the heating test of the safety test for the unit cell and assembled battery of the lithium ion secondary battery for mobile electronic devices.

(2) As a result of the heating test, the range of the capacity retention ratio determined to be OK is checked, and the value at which the deterioration rate is maximized is regarded as the maximum safety deterioration rate. (In the case of the example shown in Table 1, the safety test result shows that the capacity retention ratio of 100 to 40% is determined to be OK. More specifically, the lithium-deposition deterioration rate of 0% to 60% is determined to be safe, and the maximum safety deterioration rate is thus 60%.)

It is to be noted that in accordance with the method for determining the maximum safety deterioration rate, charge/discharge is performed at −20° C., which is a condition under which lithium is likely to be deposited. Accordingly, the test was performed on the assumption that the capacity retention ratio herein was predominantly deteriorated by lithium deposition.

TABLE 1

| Capacity Retention Ratio after Low-Temperature Cycle | Safety Test Result |
|---|---|
| 100~90% | OK |
| 90~80% | OK |
| 80~70% | OK |
| 70~60% | OK |
| 60~50% | OK |
| 50~40% | OK |
| 40~30% | NG |
| 30~20% | NG |
| 20~10% | NG |
| 10~0% | NG |

Next, an example of calculating the SOS by the safety evaluation unit 15 will be described. The safety evaluation unit 15 calculates the SOS on a periodic basis and in real time, for example. The following calculation example will be described with the use of the following conditions. Rated Capacity of Electric Storage Module 1: 1000 Ah F Parameter; 1.5 (stay voltage zone of 3.45 V or higher) Maximum Safety Deterioration Rate: 60%

The safety evaluation unit 15 multiplies the accumulated value of the charge/discharge time shown in FIG. 4 by the current value in the current zone to which the accumulated value of the charge/discharge time belongs, thereby calculating the capacity (Ah), and divides the calculation result by the rated capacity of the electric storage module 1, thereby calculating the charge/discharge cycle value. The current value in the current zone refers to the maximum value at the charge rate, 0 at C=0, or the absolute value of the minimum value at the discharge rate. Specifically, the accumulated value of the charge/discharge time corresponding to the temperature range of "20≤Temp<40" and the charge rate of "0<C≤1" is "800". The accumulated value "800" of the charge/discharge time is multiplied by "1", which is the current value in the current zone, and the result is divided by "1000", which is the rated capacity of the electric storage module 1, to calculate the charge/discharge cycle value of "0.8". In addition, the accumulated value of the charge/discharge time corresponding to the temperature range of "20≤Temp<40" and the charge rate of "−1≤C≤0" is "1000". The accumulated value "1000" of the charge/discharge time is multiplied by "1 (absolute value of −1)", which is the current value in the current zone, and the result is divided by "1000", which is the rated capacity of the electric storage module 1, to calculate the charge/discharge cycle value of "1". FIG. 5 shows the result of calculating the charge/discharge cycle value.

Next, the safety evaluation unit 15 multiplies the charge/discharge cycle value by the corresponding D parameter and F parameter. For example, the charge/discharge cycle value corresponding to the temperature range of "−20≤Temp<0" and the charge rate of "0≤C≤1" is "0.001" (see FIG. 5). The safety evaluation unit 15 multiplies the charge/discharge cycle value of "0.001" by the corresponding D parameter of "500" (see FIG. 2) and F parameter of "1.5". As a result, "0.75" is calculated. The safety evaluation unit 15 performs the same calculation for the other cells. FIG. 6 shows a calculation result.

The safety evaluation unit 15 adds the calculation results performed for each cell in the row direction. For example, "1.5" is calculated by adding the calculation results of "0.75", "0.75", "0", "0", and "0" for each cell in the row with the charge rate of "0<C≤1". Then, the safety evaluation unit 15 adds the calculation results for each row in the column direction to obtain "3.15". The "3.15" is a value that indicates the lithium-deposition deterioration rate.

Then, the safety evaluation unit 15 substitutes the calculated lithium-deposition deterioration rate and maximum safety deterioration rate into the formula (1) to calculate the SOS. Specifically, the SOS is:

$$SOS=100-3.15/60\times100=94.75\ (\%).$$

Figures 7, 8:
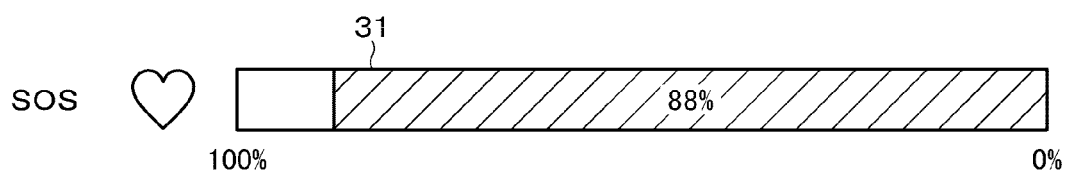
FIG. 7 is a diagram showing an SOS and a lithium-deposition deterioration rate in comparison.
FIG. 8 is a diagram illustrating an example of displaying an SOS.

FIG. 7 is a diagram showing the relationship between the lithium-deposition deterioration rate and the SOS (provided that the maximum safety deterioration rate was set to be 60%). If the lithium-deposition deterioration rate increases to, for example, 30%, the SOS is 50%, and the electric storage module 1 thus falls within the normal operation range. If the lithium-deposition deterioration rate increases to, for example, 50%, the SOS is 16.7%, and the electric storage module 1 thus falls within the normal operation range. If the lithium-deposition deterioration rate increases to, for example, 60%, the SOS becomes 0%, and it is determined that the electric storage module 1 is broken down. According to the present application, the use of the SOS makes it possible to determine the safety of the electric storage module 1, which has conventionally failed to be determined only by the capacity retention ratio and the SOH, thereby making it possible to use the electric storage module 1 until an appropriate timing.

FIG. 8 is a diagram illustrating an example of displaying the SOS. As illustrated in FIG. 8, the SOS is expressed in percentage, for example. Specifically, a bar 31 with the left side for 100% on and the right side for 0% is displayed, and the inside of the bar 31 emits light corresponding to the calculated rate of SOS. When the SOS becomes 0% or close to 0%, the inside of the bar 31 may blink or the like, or a warning message may be displayed together. In addition, the SOS is not limited to being displayed with the bar 31 used, and may be displayed as a numerical value or the like. In addition, the SOS may be notified by voice in response to a predetermined operational input. When the SOS becomes 0%, the user replaces the electric storage module 1.

According to an embodiment, for example, the following effects can be obtained.

The deterioration due to lithium deposition in the case of causing a charge/discharge current to flow allows the safety of the electric storage module to be appropriately evaluated. The conventional capacity retention ratio, SOH, and the like have been evaluated including deterioration due to storage and deterioration that makes no contribution to lithium deposition, such as charge/discharge at a normal temperature and a low rate, and thus, lithium-deposition deterioration related to safety has not been appropriately evaluated. For example, if the capacity retention ratio is 50%, the evaluation has been performed including a factor that makes no contribution to lithium-deposition deterioration such as storage deterioration, and thus the evaluation has been insufficient in terms of safety evaluation. According to an embodiment, the lithium-deposition deterioration can be appropriately evaluated, thus allowing for accurately evaluating the safety and notifying the user of the safety.

The SOS can be calculated, based on the use history from the manufacture of the electric storage module to date. In addition, the SOS can be calculated in real time, thus eliminating the need to carry out any non-destructive inspection, periodic inspection with the electric storage module stopped for safety check, or the like.

When the reuse of the electric storage module is considered, the indication of the SOS allows the safety of the electric storage module to be proved. In addition, the SOS can be used as an index that indicates the safe value of the electric storage module. The SOS is displayed in percentage with the use of the bar display, the user can intuitively recognize the safety.

While the present application is described herein, the contents of the present application are not to be considered limited thereto, and it is possible to make various modifications thereof.

According to an embodiment, the function of the safety evaluation unit may be incorporated in the control unit, and in this case, the control unit may be adapted to calculate the safety evaluation value.

In the case of the electric storage module connected to a higher-level controller, the information stored in the use history storage unit may be transmitted from the electric storage module to the controller. Further, the safety evaluation value may be calculated in the higher-level controller. In addition, in the case of a plurality of electric storage modules connected to the higher-level controller, the SOS may be displayed for each electric storage module.

The electric storage module may communicate with an external device such as a personal computer, and the SOS calculated by the electric storage module may be transmitted to the personal computer via the communication. Then, the SOS may be displayed on the display of the personal computer in the mode illustrated in FIG. 8 or the like. As described above, the SOS may be output to the external device in response to control by the control unit of the electric storage module. Examples of the device that displays the SOS include a smartphone and an in-vehicle display device in addition to the personal computer described above.

According to an embodiment, the value related to the charge/discharge time may be the charge/discharge cycle value calculated based on the charge/discharge time, or other parameters.

As a value related to the charge/discharge time, an integrated capacity value (Total Capacity) may be used. The integrated capacity value is calculated by multiplying the accumulated value of the charge/discharge time by the current value in the current zone to which the accumulated value of the charge/discharge time belongs. In the case of using the integrated capacity value instead of the charge/discharge cycle value, it is necessary to use a value obtained by resetting the D parameter (for the integrated capacity value).

While the integrated capacity value is divided by the rated capacity of the electric storage module in the calculation of the charge/discharge cycle value, the rated capacity changes depending on the deterioration of the electric storage module, and a calculation error is thus caused in the electric storage module deteriorated progressively. When the integrated capacity value is used, the SOS can be calculated more accurately with an error reduced. The SOS is calculated as in the following formula (3) as with the case of the formula (1).

$$SOS = 100 - \frac{\sum (D * F * (\text{Total Capacity}))}{\text{Maximum Safety Deterioration Rate}} \times 100 \quad (3)$$

According to an embodiment, the safety evaluation value is referred to as the SOS (State Of Safety), but other names can be used. For example, the safety evaluation value may be referred to as an SOL (State Of Life), an SOR (State Of Reliability), or an SOV (State Of Value).

The electric storage module 1 according to the present application can be used for mounting on an electric tool, an electric vehicle, various electronic devices, or the like, or for supplying electric power thereto.

Figure 9:
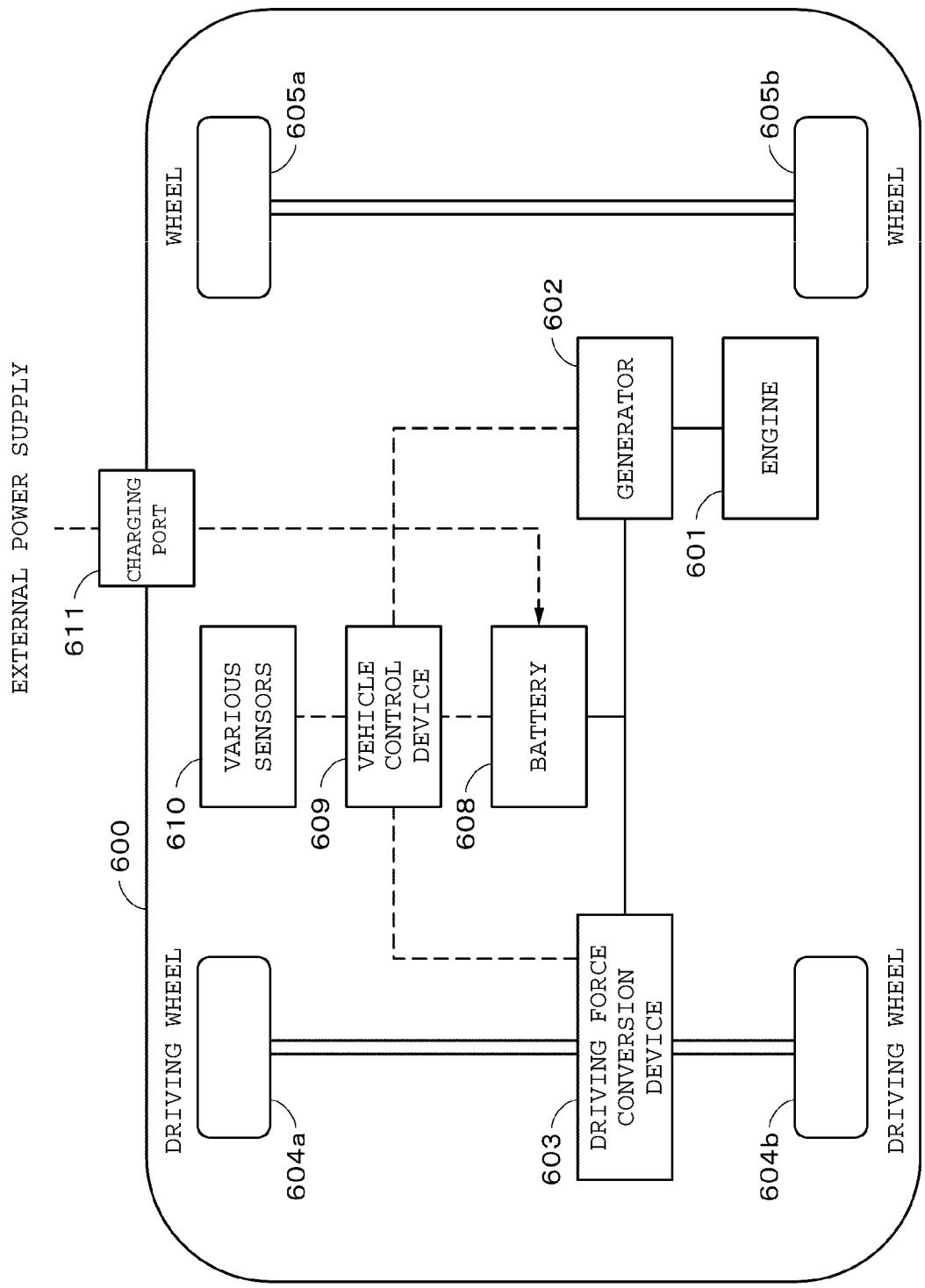
FIG. 9 is a diagram for illustrating an application example.

FIG. 9 schematically illustrates a configuration example of a hybrid vehicle (HV) that employs a series hybrid system to which the present application is applied, as an example of applying the present application to an electric storage system for an electric vehicle. The series hybrid system is intended for a vehicle that runs on an electric power-driving force conversion device, with the use of electric power generated by a generator powered by an engine, or the electric power stored once in the battery.

The hybrid vehicle 600 carries an engine 601, a generator 602, the electric power-driving force conversion device (direct-current motor or alternate-current motor, hereinafter referred to simply as a "motor 603"), a driving wheel 604a, a driving wheel 604b, a wheel 605a, a wheel 605b, a battery 608, a vehicle control device 609, various sensors 610, and a charging port 611. The electric storage unit of the electric storage module 1 according to the embodiment can be applied to the battery 608 described above, and the other configuration thereof can be applied to the vehicle control device 609.

The motor 603 is operated by the electric power of the battery 608, and the torque of the motor 603 is transmitted to the driving wheels 604a and 604b. The torque produced by the engine 601 makes it possible to reserve, in the battery 608, the electric power generated by the generator 602. The various sensors 610 control the engine rotation speed via the vehicle control device 609, and control the position of a throttle valve, not shown.

When the hybrid vehicle 600 is decelerated by a braking mechanism, not shown, the resistance force during the deceleration is applied as torque to the motor 603, and the regenerative electric power generated by the torque is reserved in the battery 608. In addition, the battery 608 is connected to an external power supply through the charging port 611 of the hybrid vehicle 600, thereby making charge possible. Such an HV vehicle is referred to as a plug-in hybrid vehicle (PHV or PHEV).

It is to be noted that the electric storage device according to the present application can also be applied to a downsized primary battery, and then used as a power supply for a pneumatic sensor system (TPMS: Tire Pressure Monitoring System) built in the wheels 604 and 605.

Although the series hybrid vehicle has been described above as an example, the present application can be also applied to a parallel system in which an engine and a motor are used in combination or a hybrid vehicle in which a series system and a parallel system are combined. Furthermore, the present application can be also applied to electric vehicles (EVs or BEVs) that run on driving by only a driving motor without using any engine, and fuel cell vehicles (FCVs). In addition, the present application is also applicable to an electric bicycle.

Figure 10:
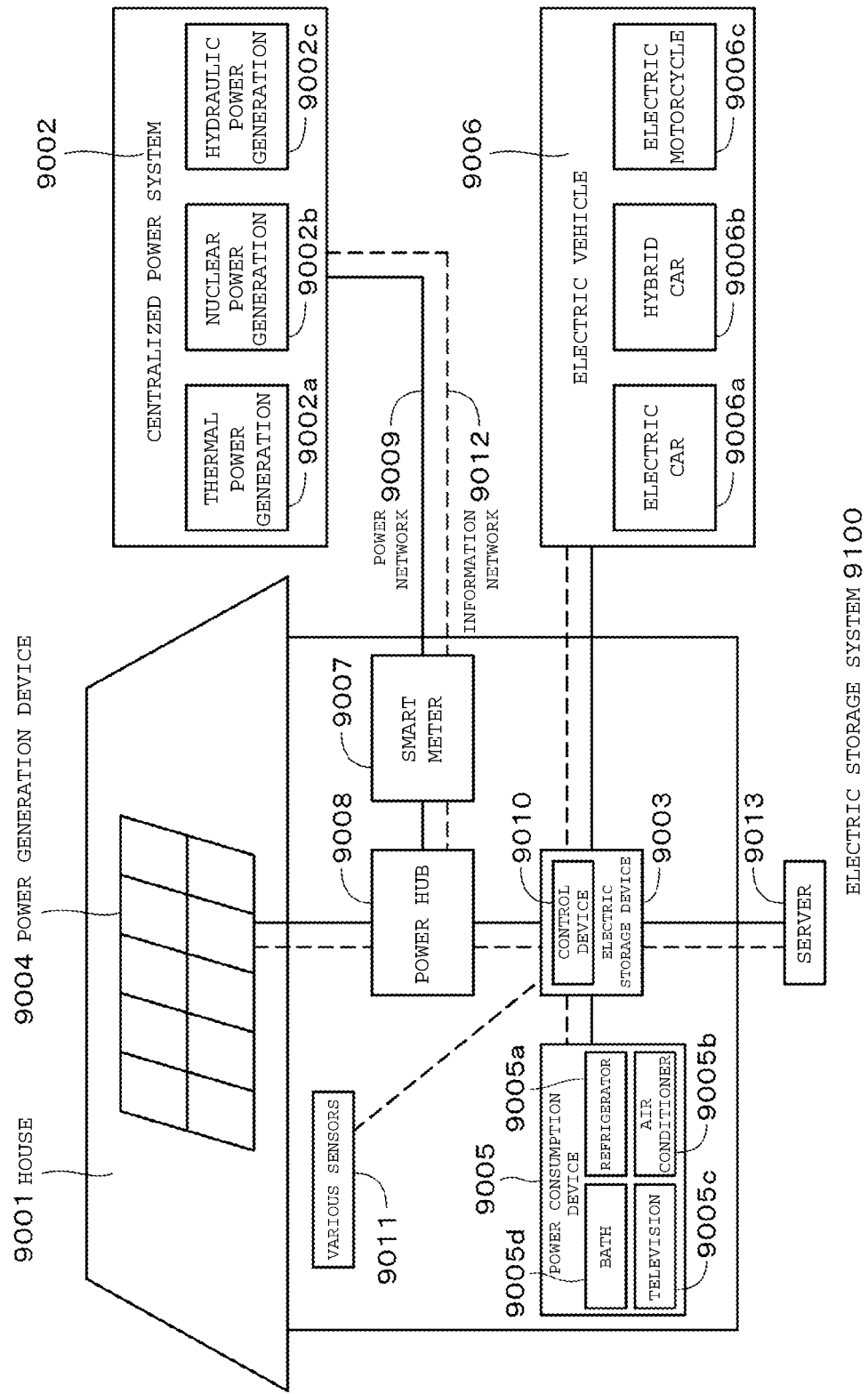
FIG. 10 is a diagram for illustrating an application example.

Another application example is an example of applying the present application to a residential electric storage system. FIG. 10 shows a configuration example of an electric storage system. For example, in an electric storage system 9100 for a house 9001, electric power is supplied to an electric storage device 9003 via a power network 9009, an information network 9012, a smart meter 9007, a power hub 9008, and the like, from a centralized power system 9002 such as a thermal power generation 9002a, a nuclear power generation 9002b, and a hydraulic power generation 9002c. At the same time, electric power is supplied to the electric storage device 9003 from an independent power source such as a home power generation device 9004. The electric power supplied to the electric storage device 9003 is stored. Electric power for use in the house 9001 is supplied through the use of the electric storage device 9003. The same electric storage system can be used not only for the house 9001 but also for buildings.

The house 9001 is provided with the home power generation device 9004, a power consumption device 9005, the electric storage device 9003, a control device 9010 for controlling the respective devices, the smart meter 9007, and sensors 9011 for acquiring various types of information. The respective devices are connected by the power network 9009 and the information network 9012. As the home power generation device 9004, a solar cell, a fuel cell, or the like is used, and electric power generated is supplied to the power consumption device 9005 and/or the electric storage device 9003. The power consumption device 9005 refers to a refrigerator 9005a, an air conditioner 9005b, a television receiver 9005c, a bath 9005d, and the like. Furthermore, the power consumption device 9005 includes an electric vehicle 9006. The electric vehicle 9006 refers to an electric car 9006a, a hybrid car 9006b, and an electric motorcycle 9006c.

The smart meter 9007 has the function of measuring the commercial power usage and transmitting the measured usage to the electric power company. The power network 9009 may be any one or combination of direct-current power feeding, alternate-current power feed, and contactless power feeding.

The various sensors 9011 are, for example, a human sensor, an illuminance sensor, an object detection sensor, a power consumption sensor, a vibration sensor, a contact sensor, a temperature sensor, an infrared sensor, and the like. Information acquired by the various sensors 9011 is transmitted to the control device 9010. With the information from the sensor 9011, weather condition, the human condition, etc. can be grasped to control the power consumption device 9005 automatically controlled, and thus minimize the energy consumption. Furthermore, the control device 9010 can transmit information on the house 9001 to an external electric power company or the like via the Internet.

The power hub 9008 performs processing such as power line branching and DC/AC conversion. Examples of the communication method of the information network 9012 connected to the control device 9010 include a method of using a communication interface such as a UART (Universal Asynchronous Receiver-Transmitter: transmission/reception circuit for asynchronous serial communication), and a method of using a sensor network in accordance with a wireless communication standard, such as Bluetooth (registered trademark), ZigBee (registered trademark), and Wi-Fi (registered trademark). The Bluetooth (registered trademark) system, which is applied to multimedia communication, can perform one-to-many connection communication. The ZigBee (registered trademark) uses the physical layer of the Institute of Electrical and Electronics Engineers (IEEE) 802.15.4. The IEEE 802.15.4 is a name of a short range wireless network standard referred to as Personal Area Network (PAN) or Wireless (W) PAN.

The control device 9010 is connected to an external server 9013. This server 9013 may be managed by any of the house 9001, an electric power company, and a service provider. The information transmitted and received by the server 9013 is, for example, power consumption information, life pattern information, power charges, weather information, natural disaster information, and information on electric power trade. These pieces of information may be transmitted to and received from a power consumption device (for example, a television receiver) in the home, but may be transmitted and received from a device outside the home (for example, a mobile phone). These pieces of information may be displayed on a device that has a display function, for example, a television receiver, a mobile phone, a Personal Digital Assistants (PDA), or the like.

The control device 9010 that controls each unit is composed of a CPU, a RAM, a ROM, and the like, and stored in the electric storage device 9003 in this example. The control device 9010 connected to the electric storage device 9003, the home power generation device 9004, the power consumption device 9005, the various sensors 9011, the server 9013 via the information network 9012, has the function of regulating, for example, the commercial power usage and the power generation. Further, the device may have a function such as handling electric power trade in the power market. The control device 9010 also functions as a power information transmission/reception unit.

As described above, the electric storage device 9003 can store therein electric power generated not only by the centralized power system 9002 such as the thermal power generation 9002a, the nuclear power generation 9002b, and the hydraulic power generation 9002c, but also by the home power generation device 9004 (solar power generation, wind power generation). Therefore, if the home power generation device 9004 fluctuates in generated power, it is possible to achieve control such as making the amount of power sent to the outside constant or discharging the power as needed. For example, the system can be also used such that electric power obtained by solar power generation is stored in the electric storage device 9003, and at night, night-time electric power at a lower rate is stored in the electric storage device 9003, and then, the electric power stored by the electric storage device 9003 is discharged and used in the daytime at a higher rate.

It is to be noted that while an example of the control device 9010 stored in the electric storage device 9003 has been described in this example, the control device 9010 may be stored in the smart meter 9007, or may be configured alone. Furthermore, the electric storage system 9100 may be used for multiple homes in multiple dwelling houses, or may be used for multiple detached houses.

An example of the electric storage system 9100 to which according to the present disclosure can be applied has been described above. The functions of the control unit and safety evaluation unit according to an embodiment can be applied to, for example, the control device 9010.

DESCRIPTION OF REFERENCE SYMBOLS

1: Electric storage module
11: Electric storage unit

12: Battery characteristic measurement unit
12A: Temperature measurement unit
12B: Current measurement unit
12C: Voltage measurement unit
12D: Counter
13: Control unit
14: Use history storage unit
15: Safety evaluation unit
16: Display unit
17: Communication unit It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. An electric storage device comprising:
an electric storage unit;
a temperature measurement unit that detects a temperature of the electric storage unit;
a current measurement unit that measures a charge/discharge current of the electric storage unit; and
a safety evaluation unit that calculates a safety evaluation value of the electric storage unit,
wherein the safety evaluation unit determines a temperature range to which the temperature detected by the temperature measurement unit belongs among multiple temperature ranges, and calculates a safety evaluation value, based on the temperature range as a result of the determination and an accumulated value of a value related to a charge/discharge time of the electric storage unit.

2. The electric storage device according to claim 1, wherein the safety evaluation unit accumulates a value obtained by multiplying the value related to the charge/discharge time by a weighting coefficient set for each of the temperature ranges to calculate the safety evaluation value.

3. The electric storage device according to claim 2, wherein the weighting coefficient is set to have a larger value in the temperature range that is farther from a reference temperature range.

4. The electric storage device according to claim 3, wherein the weighting coefficient is, in charging, set to have a larger value as the temperature range is lower than the reference temperature range.

5. The electric storage device according to claim 2, wherein
the weighting coefficient is also set depending on the charge/discharge current, and
the weighting coefficient is set to be larger as the charge/discharge current is larger.

6. The electric storage device according to claim 1, wherein
the electric storage unit includes
a plurality of batteries, and
a voltage measurement unit that measures voltages of the plurality of batteries, and
the safety evaluation unit accumulates the value obtained by multiplying the value related to the charge/discharge time by a voltage coefficient set depending on the voltages measured by the voltage measurement unit to calculate the safety evaluation value.

7. The electric storage device according to claim 6, wherein the voltage coefficient is set to have a larger value as the voltage value is larger.

8. The electric storage device according to claim 1, wherein the safety evaluation value is expressed in percentage.

9. The electric storage device according to claim 1, wherein
the value related to the charge/discharge time is calculated as a charge/discharge cycle value, and
the charge/discharge cycle value is calculated by multiplying an accumulated value of the charge/discharge time by a current value measured by the current measurement unit and dividing a result of the multiplication by a rated capacity of the electric storage unit.

10. The electric storage device according to claim 1, wherein
the value related to the charge/discharge time is calculated as an integrated capacity value, and
the integrated capacity value is calculated by multiplying an accumulated value of the charge/discharge time by a current value measured by the current measurement unit.

11. The electric storage device according to claim 9, wherein the safety evaluation unit calculates the safety evaluation value (SOS) in accordance with the following formula (1):

$$SOS = 100 - \frac{\sum (D * F * (\text{Cycle Number}))}{\text{Maximum Safety Deterioration Rate}} \times 100 \quad (1)$$

(where D in the formula (1) represents a weighting coefficient, F therein represents a voltage coefficient, and Cycle Number therein represents a charge/discharge cycle value).

12. The electric storage device according to claim 10, wherein the safety evaluation unit calculates the safety evaluation value (SOS) in accordance with the following formula (3):

$$SOS = 100 - \frac{\sum (D * F * (\text{Total Capacity}))}{\text{Maximum Safety Deterioration Rate}} \times 100 \quad (3)$$

(where D in the formula (3) represents a weighting coefficient, F therein represents a voltage coefficient, and Total Capacity therein represents an integrated capacity value).

13. The electric storage device according to claim 1, comprising:
a control unit;
a display unit; and
wherein the safety evaluation value is output to the control unit and displayed on the display unit by the control unit.

14. An electric vehicle comprising the electric storage device according to claim 1.

15. An electric power system that receives an electric power supply from the electric storage device according to claim 1 or supplies electric power from a power generation device or a power network to the electric storage device.

* * * * *